(12) United States Patent
Liu et al.

(10) Patent No.: US 11,257,517 B1
(45) Date of Patent: Feb. 22, 2022

(54) DATA STORAGE DEVICE SEEKING MULTIPLE ACTUATORS TO IMPROVE PERFORMANCE

(71) Applicant: Western Digital Technologies, Inc., San Jose, CA (US)

(72) Inventors: Kexiu Liu, Foothill Ranch, CA (US); David R. Hall, Rochester, MN (US); Kuang Yang Tu, Irvine, CA (US); Jenghung Chen, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/346,732

(22) Filed: Jun. 14, 2021

(51) Int. Cl.
| | |
|---|---|
| *G11B 20/10* | (2006.01) |
| *G11B 5/596* | (2006.01) |
| *G11B 5/008* | (2006.01) |
| *G11B 5/48* | (2006.01) |

(52) U.S. Cl.
CPC ...... *G11B 5/59666* (2013.01); *G11B 5/00852* (2013.01); *G11B 5/4813* (2013.01)

(58) Field of Classification Search
None
See application file for complete search history.

(56) References Cited

U.S. PATENT DOCUMENTS

| | | | | |
|---|---|---|---|---|
| 2,824,694 | A * | 2/1958 | Boni | G06F 7/38 235/419 |
| 3,881,184 | A * | 4/1975 | Koepcke | G05B 19/4163 369/30.01 |
| 5,315,447 | A * | 5/1994 | Nakayama | G06F 3/0601 360/49 |
| 6,597,528 | B1 * | 7/2003 | Pang | G11B 5/5556 360/78.04 |
| 8,775,720 | B1 * | 7/2014 | Meyer | G11B 20/10 711/103 |
| 9,165,583 | B1 * | 10/2015 | Beker | G11B 5/5547 |
| 10,014,018 | B1 * | 7/2018 | Kiyonaga | G11B 5/5547 |
| 10,540,116 | B2 * | 1/2020 | Seo | G06F 3/0688 |
| 10,839,839 | B1 | 11/2020 | Uchida et al. | |
| 10,872,629 | B2 | 12/2020 | Hall | |
| 10,930,310 | B1 | 2/2021 | Uchida et al. | |
| 2003/0056059 | A1 * | 3/2003 | Fox | G06F 3/0601 711/112 |
| 2003/0149837 | A1 * | 8/2003 | Coker | G06F 3/0601 711/113 |

(Continued)

*Primary Examiner* — Peter Vincent Agustin
(74) *Attorney, Agent, or Firm* — Patterson & Sheridan, LLP; Steven H. Versteeg

(57) ABSTRACT

A data storage device is disclosed comprising a plurality of disk surfaces, a first plurality of heads actuated over a first subset of the disk surfaces by a first actuator, and a second plurality of heads actuated over a second subset of the disk surfaces by a second actuator. A first access command is executed using the first actuator and a second access command is executed using the second actuator. When the first access command finishes before the second access command finishes, a third access command is selected to execute using the first actuator based on a time remaining (To2) to finish the second access command, and at least part of the second access command is executed while concurrently executing at least part of the third access command during To2.

22 Claims, 6 Drawing Sheets

(56) References Cited

U.S. PATENT DOCUMENTS

| | | | |
|---|---|---|---|
| 2005/0015648 A1* | 1/2005 | Tawada | G11B 27/36 714/5.1 |
| 2010/0195463 A1* | 8/2010 | Kurashige | G11B 19/02 369/53.45 |
| 2020/0286512 A1* | 9/2020 | Hall | G11B 5/5573 |

* cited by examiner

DATA STORAGE DEVICE SEEKING MULTIPLE ACTUATORS TO IMPROVE PERFORMANCE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
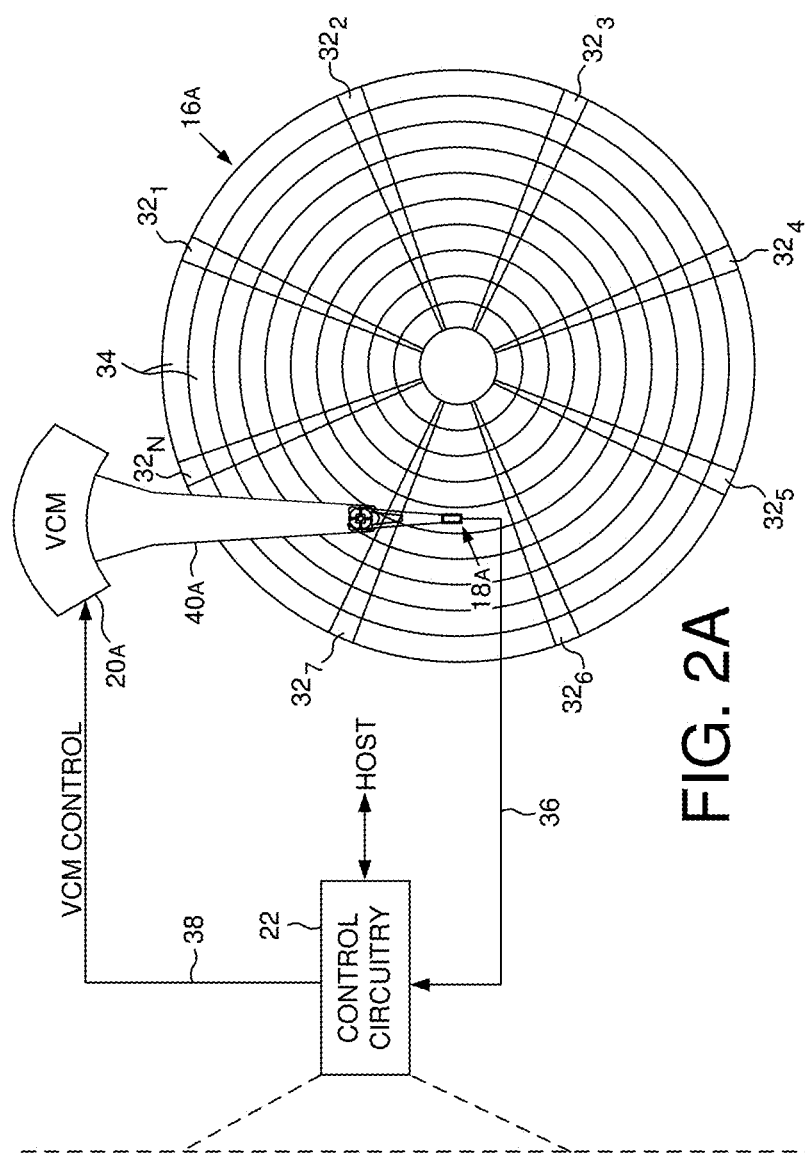
FIG. 2A shows a data storage device in the form of a disk drive according to an embodiment comprising a head actuated over a disk surface.
Figure 2B:
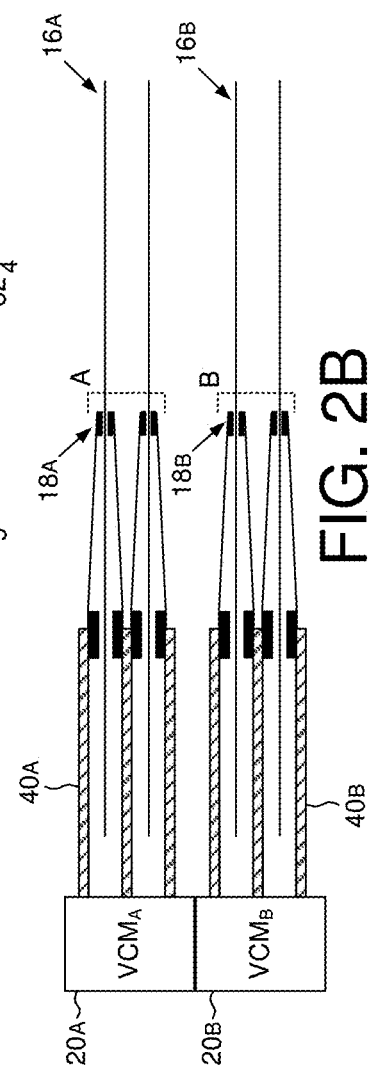
FIG. 2B shows an embodiment wherein the disk drive comprises a split actuator comprising a first VCM actuating a first subset of actuator arms and a second VCM actuating a second subset of actuator arms about a common pivot.
Figure 2C:
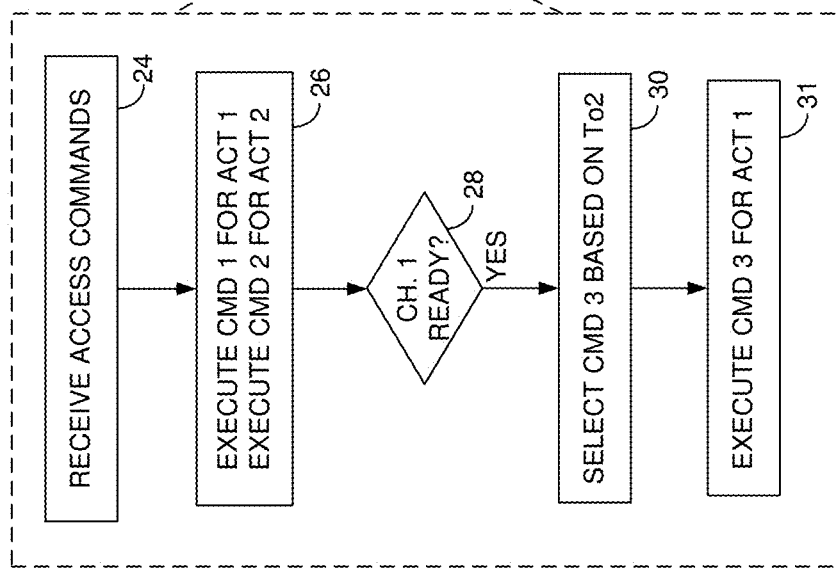
FIG. 2C is a flow diagram according to an embodiment wherein at least part of two access commands are executed concurrently in order to improve a performance of the disk drive.

FIGS. 2A and 2B show a data storage device in the form of a disk drive according to an embodiment comprising a plurality of disk surfaces (e.g., 16A and 16B). A first plurality of heads (e.g., 18A) are actuated over a first subset of the disk surfaces (e.g., 16A) by a first actuator (e.g., 20A), and a second plurality of heads (e.g., 18B) are actuated over a second subset of the disk surfaces (e.g., 16B) by a second actuator (e.g., 20B). The disk drive further comprises control circuitry 22 configured to execute the flow diagram of FIG. 2C, wherein a plurality of access commands are received each associated with one of the heads (block 24). A first access command is executed using the first actuator and a second access command is executed using the second actuator (block 26). When the first access command finishes before the second access command finishes (block 28), a third access command is selected to execute using the first actuator based on a time remaining (To2) to finish the second access command (block 30). At least part of the second access command is executed while concurrently executing at least part of the third access command during To2 (block 31).

Figure 1:
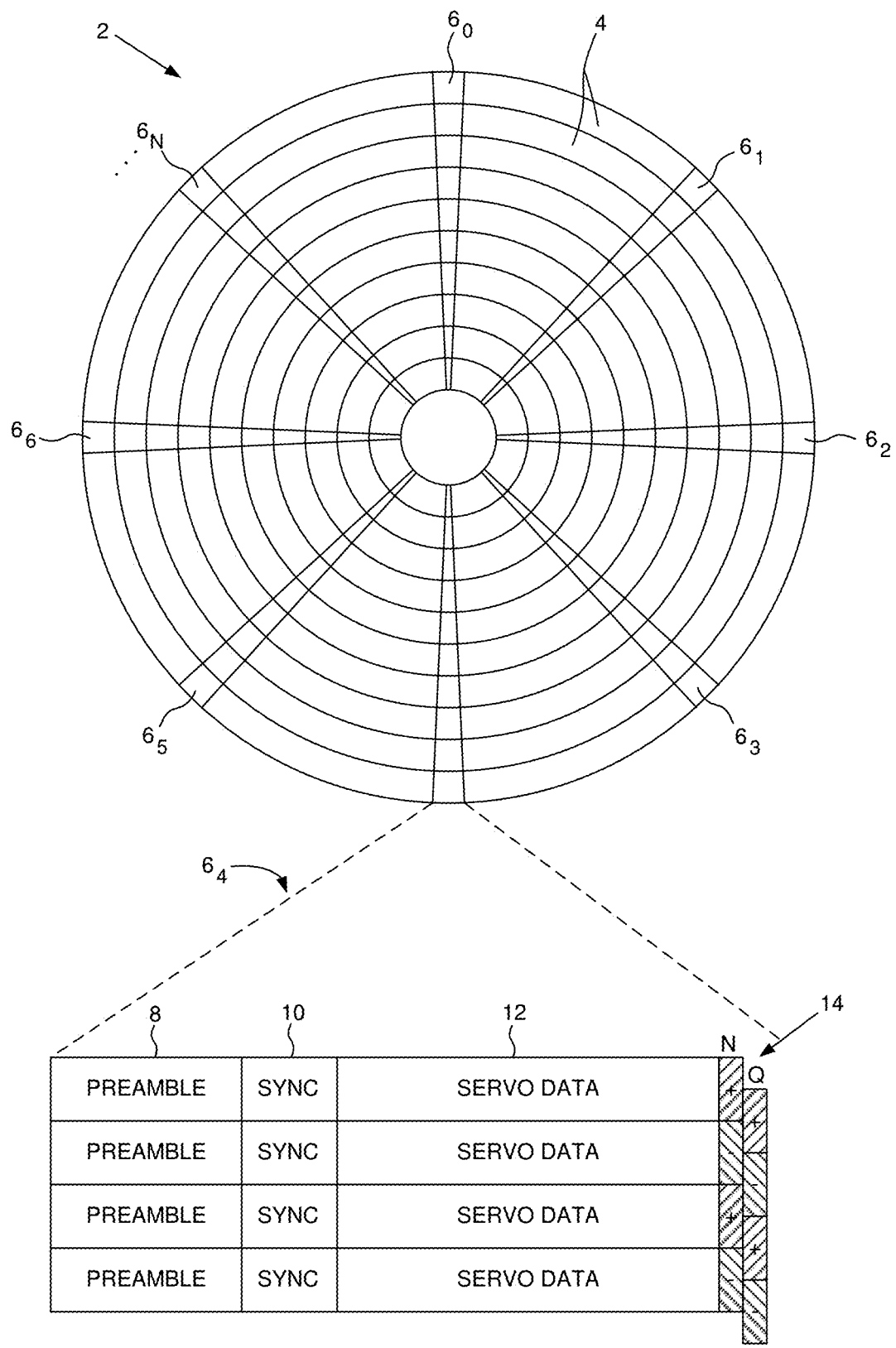
FIG. 1 shows a prior art disk format comprising a plurality of servo tracks defined by servo sectors.

In the embodiment of FIG. 2A, each disk surface (e.g., 16A) comprises a plurality of servo sectors $32_1$-$32_N$ that define a plurality of servo tracks 34, wherein data tracks are defined relative to the servo tracks at the same or different radial density. The control circuitry 22 processes a read signal 36 emanating from the head to demodulate the servo sectors and generate a position error signal (PES) representing an error between the actual position of the head and a target position relative to a target track. A servo control system in the control circuitry 22 filters the PES using a suitable compensation filter to generate a control signal 38 applied to a coarse actuator (e.g., VCM 20A) which rotates an actuator arm (e.g., 40A) about a pivot in order to actuate the corresponding heads radially over the disk surfaces in a direction that reduces the PES. The heads may also be servoed using a fine actuator, such as a piezoelectric (PZT) actuator, configured to actuate a suspension relative to the actuator arm, and/or configured to actuate the head relative to the suspension. The servo sectors $32_1$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2B, the first and second VCMs 20A and 20B rotate the respective set of actuator arms (e.g., 40A and 40B) about a common pivot in what has been referred to as a split actuator design. In another embodiment, a first and second VCM may be configured to actuate a respective set of actuator arms about a separate pivot, for example, mounted at different circumferential locations about the disks. Other embodiments may employ more than two actuators, for example, an embodiment employing more than two actuators actuated about a common pivot or an embodiment employing multiple split actuators mounted at different circumferential locations about the disks.

Figure 3A:
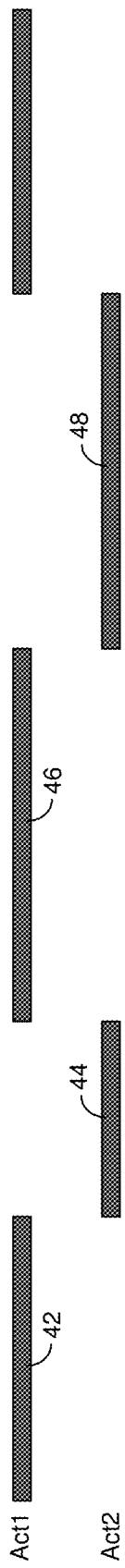
FIG. 3A shows operation of a prior art disk drive wherein access commands are executed serially using first and second actuators.

FIG. 3A shows operation of a prior art disk drive wherein pending access commands are executed serially using first and second actuators. In this example, a first actuator (Act1) is used to execute a first access command 42 by seeking to a corresponding data track and performing a write/read operation. When access command 42 is finished executing, a second actuator (Act2) is used to execute a second access command 44 by seeking to a corresponding data track and performing a write/read operation. This process then continues for access command 46, access command 48, and so on. A suitable sort algorithm may sort the pending access commands into an optimal execution order based on any suitable criteria, such as minimizing the overall execution latency of the access commands, optimizing power consumption, etc. However, executing the access commands serially such as shown in FIG. 3A means the disk drive is operating at a lower performance as compared to overlapping the execution of at least part of two access commands such that the two actuators (Act1 and Act2) are concurrently seeking at least part of the time.

Figure 3B:
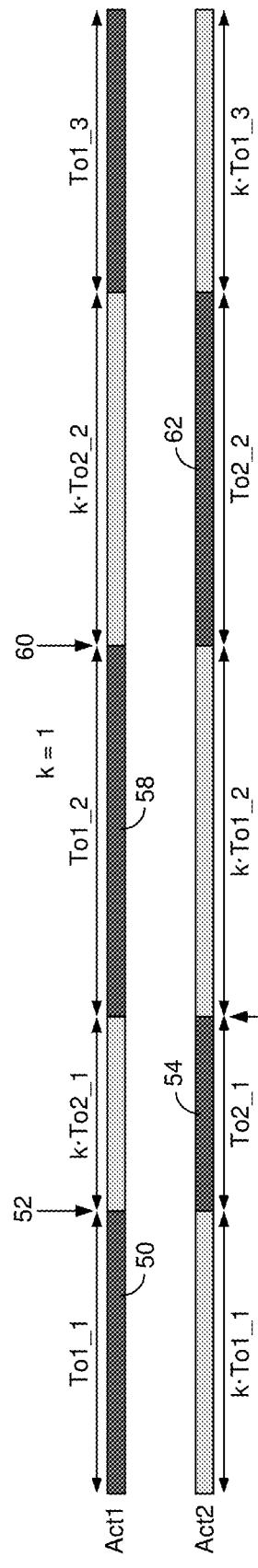
FIG. 3B shows an embodiment wherein when execution of a first access command using the first actuator finishes before a second access command using the second actuator, a third access command is selected for execution using the first actuator based on a time remaining (To2) for the second access command.

FIG. 3B shows an embodiment wherein at least part of two access commands are executed concurrently in order to reduce the power consumption of the disk drive while ensuring a throughput of the access commands does not fall below a throughput threshold associated with executing the access commands serially such as shown in FIG. 3A. In this embodiment, when the first actuator finishes executing an access command, a next access command for the first actuator is selected based on a time remaining (To2) for the second actuator to finish executing its access command, and vise versa. In the example of FIG. 3B, the light shaded intervals represent a derated seek velocity and the dark shaded intervals represent a normal seek velocity. That is instead of seeking at the normal velocity for the entire seek such as shown in FIG. 3A, the seek profile consists of seeking at a lower velocity for a first interval (light shaded region) and then seeking at the normal velocity for a second interval (dark shaded region). In the embodiment of FIG. 3B, the derated part of the seek interval is configured to be k·To, where k is a unity scalar and To represents the time remaining for the other actuator to finish executing its access command. For example, when the first actuator finishes executing access command 50 at time 52, the second actuator will finish executing access command 54 at time 56 (i.e., the time remaining for the second actuator to finish its access command is To2_1). Accordingly in this embodiment, the next access command 58 for the first actuator to execute is selected based on the next seek profile comprising a derated seek velocity for time To2_1, followed by a normal seek velocity for a corresponding time needed to reach the next access command. By limiting the duration of the derated seek velocity to To2_1, it ensures the next access command selected for the first actuator will at least be the same access command selected in FIG. 3A (i.e., at least the same throughput performance associated with executing the access commands serially). When the second actuator finishes executing access command 54 at time 56, the first actuator will finish executing access command 58 at time 60 (i.e., the time remaining for the first actuator to finish its access command is To1_2). Accordingly the next access command 62 for the second actuator to execute is selected based on the next seek profile comprising a derated seek velocity for time To1_2, followed by a normal seek velocity for a corresponding time needed to reach the next access command. Again by limiting the duration of the derated seek velocity to To1_2, it ensures the next access command selected for the second actuator will at least be the same access command selected in FIG. 3A (i.e., at least the same throughput performance associated with executing the access commands serially). In this embodiment, the derated seek velocity of the seek profiles decreases the power consumption of the actuators while achieving at least the same throughput performance as compared to executing the access commands serially as shown in FIG. 3A.

Figure 3C:
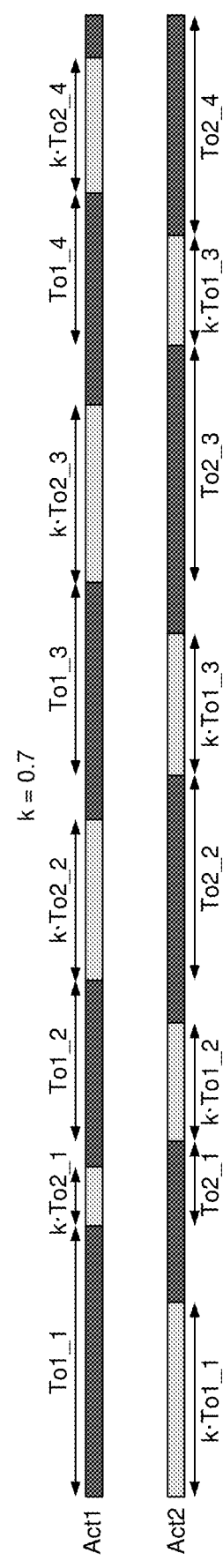
FIG. 3C shows an embodiment wherein a seek profile for the first actuator is generated based on k·To2 and a seek profile for the second actuator is generated based on k·To1.

In one embodiment, the seek profile for the first actuator may be derated based on a percentage of the time remaining for the second actuator to finish executing its access command (and vise versa), that is, based on k·To2 where k is a predetermined scalar. In this embodiment, decreasing the scalar k increases a throughput and increases a power consumption of the disk drive. An example of this embodiment is shown in FIG. 3C wherein the derated part of the seek interval is reduced from To2 to k·To2 (where k=0.7), thereby increasing the second part of the seek interval over which the actuator seeks at a normal velocity. This increases the power consumption but also increases the throughput by decreasing the latency of each access command. That is, decreasing the scalar k such as shown in FIG. 3C results in more access commands being executed over a given interval, for example, as compared to FIG. 3B where k=1.

Figure 4A:
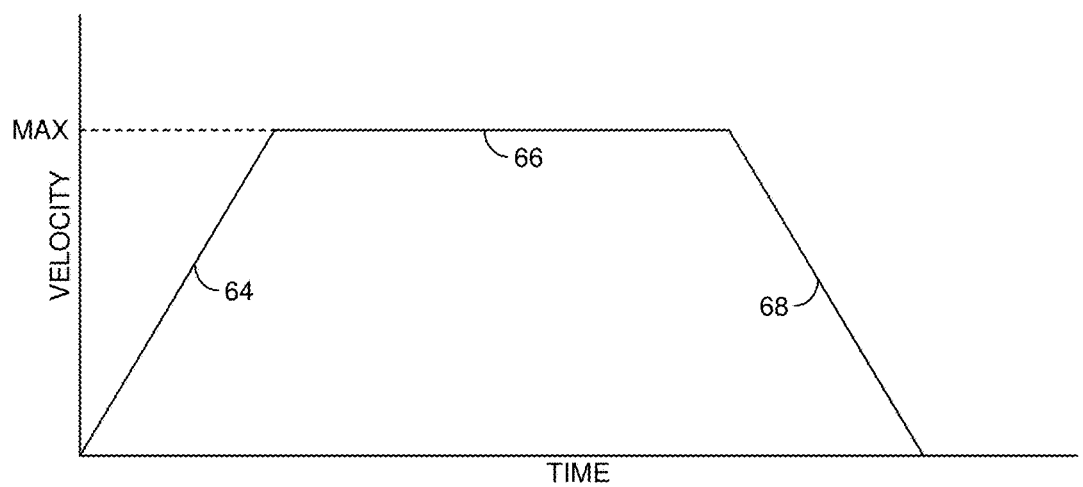
FIG. 4A shows a normal seek profile for one of the actuators according to an embodiment.
Figure 4B:
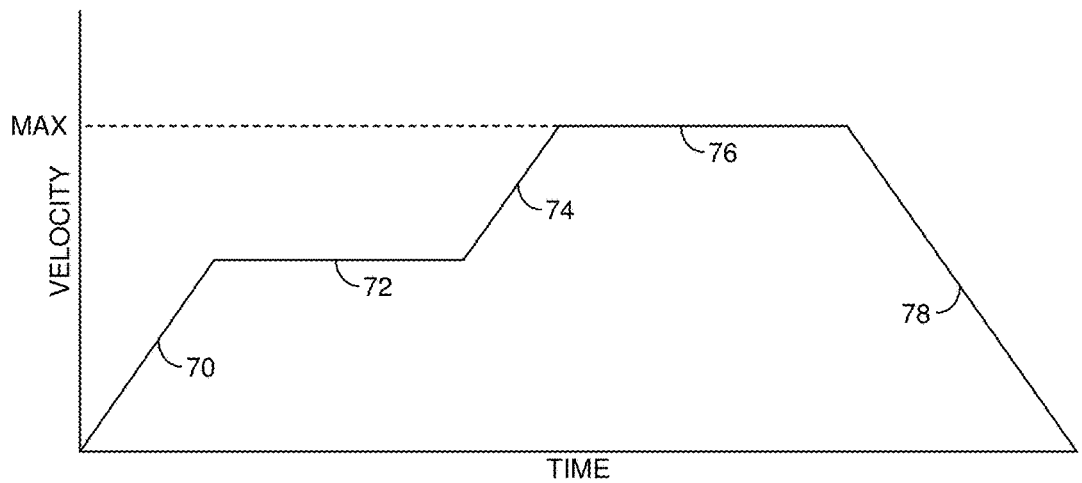
FIG. 4B shows a derated seek profile used for concurrently seeking one of the actuators according to an embodiment.
Figure 4C:
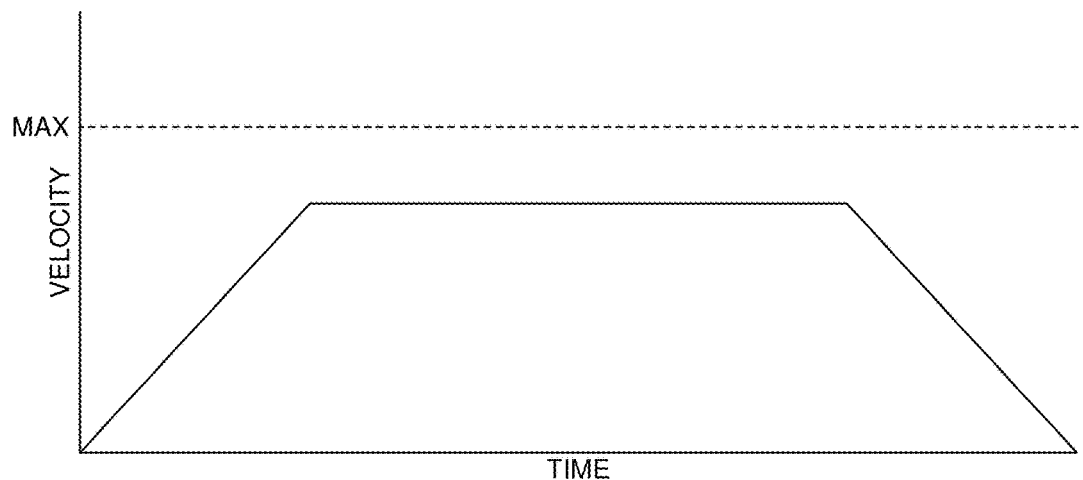
FIG. 4C shows an alternative derated seek profile used for concurrently seeking one of the actuators according to an embodiment.

FIG. 4A shows a normal (non-derated) seek profile for one of the actuators according to an embodiment which consists of an acceleration interval 64 to a maximum velocity, a constant velocity interval 66 at the maximum velocity, and a deceleration interval 68. FIG. 4B shows an example of a derated seek profile (based on k·To) for one of the actuators according to an embodiment which consists of a first acceleration interval 70, a first constant velocity interval 72 at a derated velocity, a second acceleration interval 74, a second constant velocity interval 76 at the maximum velocity, and a deceleration interval 78. In the example of FIG. 4B, the first acceleration interval 70 and the first constant velocity interval 72 may span the interval k·To such as shown in FIG. 3C. In other embodiments, the seek profile for one of the actuators may be derated based on k·To using any other suitable technique. For example, FIG. 4C shows an embodiment wherein the seek profile may be derated by reducing the maximum velocity as compared to the constant velocity interval 66 of the normal seek profile shown in FIG. 4A. In this embodiment, the performance of the seek (total seek time) of FIG. 4C may be equivalent to the seek profile of FIG. 4B. That is, in one embodiment the seek profile may be derated by making any suitable adjustments to the normal seek profile shown in FIG. 4A in order to achieve the same seek performance as the derated seek profile shown in FIG. 4B. In one embodiment, the derated seek profiles may be generated on-the-fly based on the overlapping execution of both actuators. For example, when there is an overlap detected in the acceleration or deceleration intervals of both actuators, the derated seek profile(s) may be generated so as to limit the peak current of the combined actuators while still achieving the desired seek performance based on k·To.

Figure 5A:
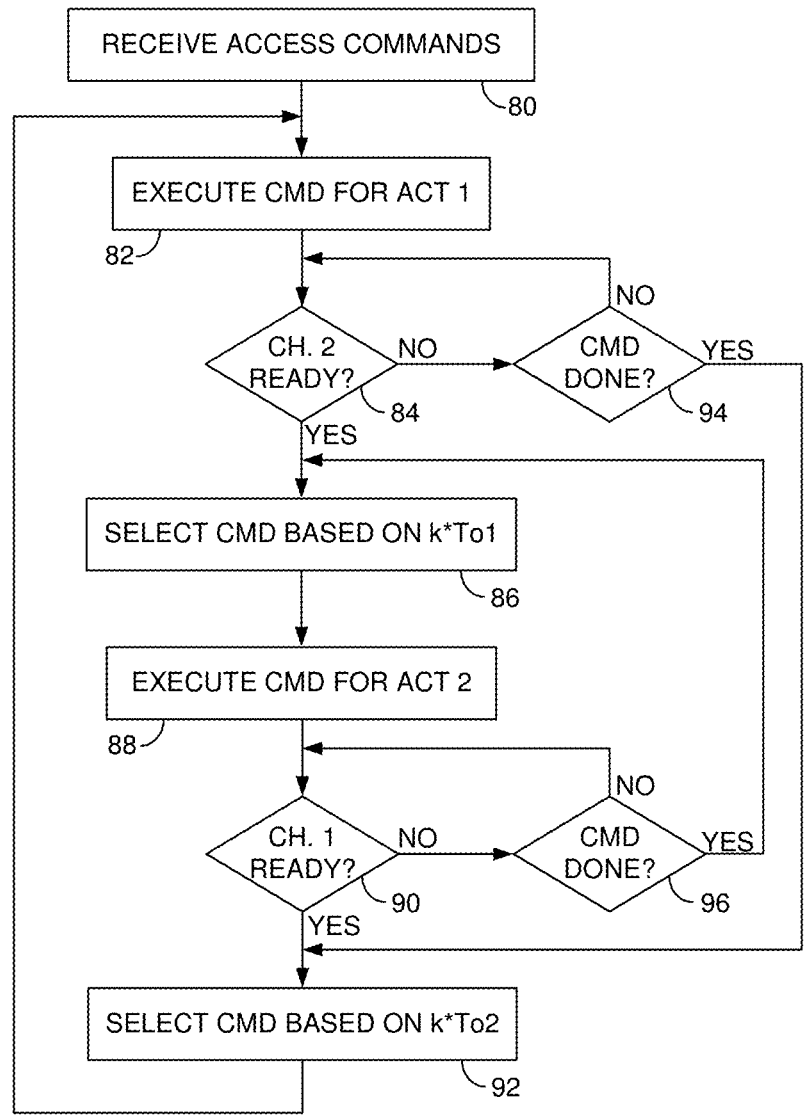
FIG. 5A is a flow diagram according to an embodiment wherein the access commands are selected for an inactive actuator based on a time remaining for an active actuator.

FIG. 5A is a flow diagram according to an embodiment wherein when a plurality of access commands are received to be serviced using both actuators (block 80), an access command is selected for a first one of the actuators to execute at block 82 (e.g., using a sort algorithm). If while executing the access command using the first actuator the second (other) actuator finishes executing its access command (block 84), a next access command is selected for the second actuator based on k·To1 (block 86) as described above. The access command selected for the second actuator is executed (block 88), and if while executing the access command the first actuator finishes executing its access command (block 90), a next access command is selected for the first actuator based on k·To2 (block 92) as described above. If the access command executed using the first actuator finishes at block 94, then a next access command is selected for the first actuator at block 92. Similarly if the access command executed using the second actuator finishes at block 96, a next access command is selected for the second actuator at block 86.

Figure 5B:
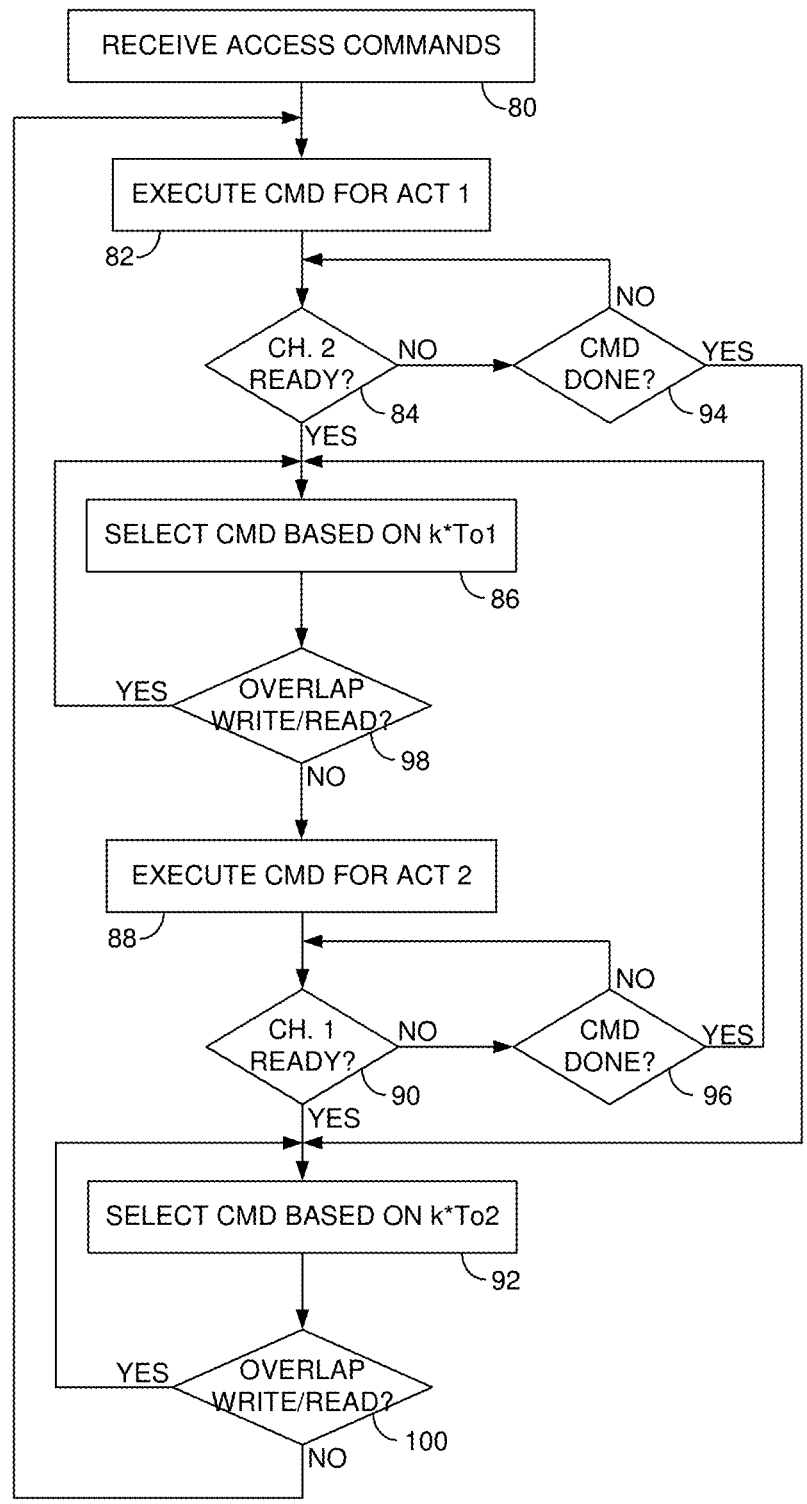
FIG. 5B is a flow diagram according to an embodiment wherein the access commands are selected for an inactive actuator based on a time remaining for an active actuator and based on whether the selected command will result in an overlap of write/read operations.

FIG. 5B is a flow diagram which extends on the flow diagram of FIG. 5A, wherein in this embodiment the control circuitry 22 may be capable of performing a single access (write/read) to a disk surface at a time. Accordingly if the access command selected at block 86 would result in an overlapping write/read (bock 98), the control circuitry 22 may select a different access command for the second actuator at block 86. Similarly if the access command selected at block 92 would result in an overlapping write/read (block 100), a different access command may be selected for the first actuator at block 94. In another embodiment, the control circuitry 22 may be capable of performing concurrent access commands (write/read) using both actuators in which case the sort algorithm for selecting the access commands may ignore an overlapping write/read condition as described above.

In one embodiment, a sort algorithm for selecting the next access command to execute at block 86 or block 94 of FIG. 5 may take into account the combined current draw of both actuators when seeking concurrently. For example, in one embodiment when the combined current draw of both actuators will exceed a predetermined current limit, the sort algorithm may select a different access command to execute similar to when there is an overlap in write/read operations at block 88 or block 96.

In one embodiment, the sort algorithm for selecting the access commands to execute for each actuator may adaptively adjust the scalar k in order to meet any suitable criteria, for example, in order to avoid an overlap of write/read operations or to avoid exceeding a current limit due to concurrently seeking both actuators. For example if a target value for the scalar k is 0.7 as described above with reference to FIG. 3C, the sort algorithm may adaptively dither the scalar k in order to meet any suitable criteria while still providing an average performance (throughput, power consumption, etc.) that corresponds to a constant scalar of k=0.7.

In one embodiment, the scalar k may be configured based on a customer of the data storage device, for example, to achieve a desired level of throughput performance versus power consumption as specified by the customer. In one embodiment, the control circuitry 22 may configure and/or adapt the scalar k over time based on a measured level of performance (e.g., measured throughput and/or power consumption). For example, in one embodiment the scalar k may be adapted over time until a desired level of performance is attained. In yet another embodiment, the scalar k may be configured by the control circuitry 22 in order to achieve a desired performance based on a queue depth of a command queue. For example, in one embodiment the throughput of the data storage device may be dependent on the queue depth for the access commands in which case the scalar k may also be dependent on the queue depth of the command queue.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, an optical disk drive, a hybrid disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a plurality of disk surfaces;
   a first plurality of heads actuated over a first subset of the disk surfaces by a first actuator;
   a second plurality of heads actuated over a second subset of the disk surfaces by a second actuator; and
   control circuitry configured to:
   receive a plurality of access commands, wherein each access command is associated with one of the heads;
   execute a first access command using the first actuator and execute a second access command using the second actuator;
   when the first access command finishes before the second access command finishes, select a third access command to execute using the first actuator based on a time remaining (To2) to finish the second access command; and
   execute at least part of the second access command while concurrently executing at least part of the third access command during To2.

2. The data storage device as recited in claim 1, wherein the control circuitry is further configured to select the third access command based on k·To2, where k is a predetermined scalar.

3. The data storage device as recited in claim 2, where decreasing k increases a throughput and increases a power consumption of the data storage device.

4. The data storage device as recited in claim 1, wherein the control circuitry is further configured to select the third access command by generating a seek profile for the first actuator based on To2.

5. The data storage device as recited in claim 1, wherein the control circuitry is further configured to concurrently seek the first actuator and the second actuator during at least part of To2.

6. The data storage device as recited in claim 5, wherein while concurrently seeking the first and second actuators the control circuitry is further configured to:
   seek the second actuator based on a first seek profile; and
   seek the second actuator based on a derated version of the first seek profile.

7. The data storage device as recited in claim 1, wherein:
   the data storage device operates according to a performance threshold exhibited when waiting to execute the third access command until after the second access command finishes; and
   the control circuitry is further configured to select the third access command based on To2 in a manner that ensures a performance of the data storage device does not fall below the performance threshold.

8. A data storage device comprising:
   a plurality of disk surfaces;
   a first plurality of heads actuated over a first subset of the disk surfaces by a first actuator;
   a second plurality of heads actuated over a second subset of the disk surfaces by a second actuator; and
   control circuitry configured to:
   receive a plurality of access commands, wherein each access command is associated with one of the heads; and
   concurrently execute at least part of a second access command using the second actuator and at least part of a third access command using the first actuator, wherein:
   the data storage device operates according to a performance threshold exhibited when serially executing the second access command and the third access command; and
   the control circuitry is further configured to concurrently execute at least part of a second access command and at least part of the third access command using a first seek profile for the first actuator and a second seek profile for the second actuator that ensures a performance of the data storage device does not fall below the performance threshold.

9. The data storage device as recited in claim 8, wherein the control circuitry is further configured to:
   execute a first access command using the first actuator and execute the second access command using the second actuator;
   when the first access command finishes before the second access command finishes, select the third access command to execute using the first actuator based on a time remaining (To2) to finish the second access command; and
   execute at least part of the second access command while concurrently executing at least part of the third access command during To2.

10. The data storage device as recited in claim 9, wherein the control circuitry is further configured to select the third access command based on k·To2, where k is a predetermined scalar.

11. The data storage device as recited in claim 10, where decreasing k increases a throughput and increases a power consumption of the data storage device.

12. The data storage device as recited in claim 9, wherein the control circuitry is further configured to select the third access command by generating the first seek profile for the first actuator based on To2.

13. The data storage device as recited in claim 9, wherein the control circuitry is further configured to concurrently seek the first actuator and the second actuator during at least part of To2.

14. The data storage device as recited in claim 13, wherein the second seek profile is a derated version of the first seek profile.

15. The data storage device as recited in claim 8, wherein the second seek profile is a derated version of the first seek profile.

16. A data storage device comprising:
   a plurality of disk surfaces;
   a first plurality of heads actuated over a first subset of the disk surfaces by a first actuator;
   a second plurality of heads actuated over a second subset of the disk surfaces by a second actuator; and
   a means for receiving a plurality of access commands, wherein each access command is associated with one of the heads;

a means for executing a first access command using the first actuator and executing a second access command using the second actuator;

when the first access command finishes before the second access command finishes, a means for selecting a third access command to execute using the first actuator based on a time remaining (To2) to finish the second access command; and a means for executing at least part of the third access command while concurrently executing at least part of the second access command during To2.

17. The data storage device as recited in claim 16, wherein the third access command is selected based on k·To2, where k is a predetermined scalar.

18. The data storage device as recited in claim 17, where decreasing k increases a throughput and increases a power consumption of the data storage device.

19. The data storage device as recited in claim 17, further comprising a means for configuring k based on at least one of:

a power or performance target for the data storage device; or a queue depth of a command queue for storing the access commands.

20. The data storage device as recited in claim 17, further comprising a means for adapting k based on at least one of:

a power or performance target for the data storage device; or a queue depth of a command queue for storing the access commands.

21. The data storage device as recited in claim 16, wherein the third access command is selected by generating a seek profile for the first actuator based on To2.

22. The data storage device as recited in claim 16, further comprising a means for concurrently seeking the first actuator and the second actuator during at least part of To2.

* * * * *